US009354246B2

(12) United States Patent
Simoni et al.

(10) Patent No.: US 9,354,246 B2
(45) Date of Patent: *May 31, 2016

(54) MEMS RESONANT ACCELEROMETER HAVING IMPROVED ELECTRICAL CHARACTERISTICS

(71) Applicant: STMicroelectronics S.r.l., Agrate Brianza (IT)

(72) Inventors: Barbara Simoni, Bareggio (IT); Claudia Comi, Milan (IT); Alberto Corigliano, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 305 days.

This patent is subject to a terminal disclaimer.

(21) Appl. No.: 13/952,503

(22) Filed: Jul. 26, 2013

(65) Prior Publication Data

US 2015/0362522 A1  Dec. 17, 2015

Related U.S. Application Data

(63) Continuation of application No. 12/875,000, filed on Sep. 2, 2010, now Pat. No. 8,516,889.

(30) Foreign Application Priority Data

Sep. 7, 2009  (IT) ................ TO2009A0687

(51) Int. Cl.
G01P 15/097 (2006.01)
G01P 15/10 (2006.01)
(52) U.S. Cl.
CPC ............. *G01P 15/097* (2013.01); *G01P 15/10* (2013.01)

(58) Field of Classification Search
CPC ... G01P 15/097; G01P 15/0888; G01P 15/18; G01P 15/0802; G01P 15/10
USPC ............... 73/514.29, 514.36, 514.38, 514.01, 73/514.15, 514.26
See application file for complete search history.

(56) References Cited

U.S. PATENT DOCUMENTS

| 4,851,080 | A | 7/1989 | Howe et al. |
| 5,261,277 | A | 11/1993 | Thomas et al. |
| 5,567,879 | A | 10/1996 | Fima et al. |
| 5,574,220 | A | 11/1996 | Amand et al. |

(Continued)

OTHER PUBLICATIONS

Aikele, M. et al., "Resonant accelerometer with self-test," *Sensors and Actuators A* 92:161-167, 2001.

(Continued)

*Primary Examiner* — Helen Kwok
(74) *Attorney, Agent, or Firm* — Seed IP Law PLLC

(57) ABSTRACT

A MEMS resonant accelerometer is disclosed, having: a proof mass coupled to a first anchoring region via a first elastic element so as to be free to move along a sensing axis in response to an external acceleration; and a first resonant element mechanically coupled to the proof mass through the first elastic element so as to be subject to a first axial stress when the proof mass moves along the sensing axis and thus to a first variation of a resonant frequency. The MEMS resonant accelerometer is further provided with a second resonant element mechanically coupled to the proof mass through a second elastic element so as to be subject to a second axial stress when the proof mass moves along the sensing axis, substantially opposite to the first axial stress, and thus to a second variation of a resonant frequency, opposite to the first variation.

19 Claims, 6 Drawing Sheets

(56) References Cited

U.S. PATENT DOCUMENTS

| | | | |
|---|---|---|---|
| 5,948,982 | A | 9/1999 | Woodruff et al. |
| 5,969,249 | A * | 10/1999 | Roessig et al. ............. 73/514.15 |
| 6,386,035 | B2 | 5/2002 | Janiaud et al. |
| 6,389,898 | B1 | 5/2002 | Seidel et al. |
| 6,634,231 | B2 | 10/2003 | Malametz |
| 6,662,655 | B2 | 12/2003 | Foote |
| 6,662,658 | B2 | 12/2003 | Foote |
| 7,104,128 | B2 | 9/2006 | Inglese et al. |
| 8,136,401 | B2 * | 3/2012 | Hentz et al. ................. 73/514.29 |
| 8,516,889 | B2 * | 8/2013 | Simoni et al. ............. 73/514.29 |
| 8,671,756 | B2 * | 3/2014 | Comi et al. ................ 73/514.29 |
| 2001/0004846 | A1 | 6/2001 | Kawai |
| 2002/0152812 | A1 | 10/2002 | Featonby et al. |
| 2003/0061877 | A1 | 4/2003 | Stewart et al. |
| 2006/0096378 | A1 | 5/2006 | Quer et al. |
| 2009/0095079 | A1 | 4/2009 | Ayazi |
| 2011/0056294 | A1 | 3/2011 | Simoni et al. |
| 2012/0132003 | A1 | 5/2012 | Comi et al. |

OTHER PUBLICATIONS

Chen, W. et al., "Design and system-level simulation of a capacitive dual axis accelerometer," Proceedings of the $2^{nd}$ IEEE International Conference on Nano/Micro Engineered and Molecular Systems, Bangkok, Thailand, Jan. 16-19, 2007, pp. 614-617.

Comi, C. "On geometrical effects in micro-resonators," *Latin American Journal of Solids and Structures* 6:73-87, 2009.

Comi, C. et al., "A Surface Micromachined Resonant Accelerometer With High Resolution," 7th EUROMECH Solid Mechanics Conference, Lisbon, Portugal, Sep. 7-11, 2009, 8 pages.

Comi, C. et al., "A High Sensitivity Uniaxial Resonant Accelerometer," 2010 IEEE 23rd International Conference on Electro Mechanical Systems (MEMS), Wanchai, Hong Kong, Jan. 24-28, 2010, p. 1017, 2 pages.

He, L. et al., "Folded Silicon Resonant Accelerometer With Temperature Compensation," *Sensors 2004, Proceedings of the IEEE* 1:512-515, Oct. 2004.

Kacem, N. et al., "From MEMS to NEMS: Modelling and characterization of the non linear dynamics of resonators, a way to enhance the dynamic range," 8th World Congress on Computational Mechanics (WCCM8), 5th European Congress on Computational Methods in Applied Sciences and Engineering (ECCOMAS 2008), Venice, Italy, Jun. 30-Jul. 5, 2008, 2 pages.

Seshia A.A. et al., "A Vacuum Packaged Surface Micromachined Resonant Accelerometer," *Journal of Microelectromechanical Systems* 11(6):784-793, Dec. 2002.

Su, S.X.P. et al., "A Resonant Accelerometer With Two-Stage Microleverage Mechanisms Fabricated by SOI-MEMS Technology," *IEEE Sensors Journal*, 5(6):1214-1223, Dec. 2005.

\* cited by examiner

MEMS RESONANT ACCELEROMETER HAVING IMPROVED ELECTRICAL CHARACTERISTICS

BACKGROUND

1. Technical Field

The present disclosure relates to a MEMS (Micro Electro Mechanical System) resonant accelerometer having improved electrical characteristics.

2. Description of the Related Art

As is known, MEMS accelerometers play an important role in the field of sensors with applications in various contexts including automotive, vibration monitoring and portable electronics. The large number of micro-accelerometers proposed in the literature and nowadays present on the market can be grouped in three classes, on the basis of the sensing principle: capacitive, resonant and piezoresistive. The more common surface micromachined accelerometers belong to the first class, but also resonant accelerometers have been produced by surface micromachining technology. In this respect, reference may be made to the following papers:

M. Aikele, K. Bauer, W. Ficker, F. Neubauer, U. Prechtel, J. Schalk, H. Seidel "Resonant accelerometer with self-test", Sensors and Actuators A, 92, 161-167, 2001;

A. A. Seshia, M. Palaniapan, T. A. Roessig, R. T. Howe, R. W. Gooch, T. R. Shimert, S. Montague "A vacuum packaged surface micromachined resonant accelerometer", JMEMS, 11, 784-793, 2002;

L. He; Y.-P. Xu; A. Qiu "Folded silicon resonant accelerometer with temperature compensation", Sensors 2004. Proceedings of IEEE, 1, 512-515, 24-27 Oct. 2004;

S. X. P. Su, H. S. Yang, A. M. Agogino "A resonant accelerometer with two-stage microleverage mechanisms fabricated by SOI-MEMS technology" Sensors, 5(6), 1214-1223, 2005.

In resonant accelerometers, the external acceleration produces a recordable shift of the resonance frequency of the structure, or of some part thereof. Resonant sensing, with respect to other sensing principles, has the advantage of direct frequency output, high potential sensitivity and large dynamic range.

Sensitivity of resonant accelerometers is generally defined as the frequency shift produced by an external acceleration of 1 g. Known resonant accelerometers obtained through surface micromachining typically have sensitivity ranging from 40 Hz/g up to 160 Hz/g, and, at least some of them, have quite large dimensions.

A conceptual diagram of a linear accelerometer is shown in FIG. 1. An inertial mass m is attached to a frame by means of a spring of stiffness k and is subject to damping from the surrounding environment, represented by a damper of coefficient b. When the reference frame is subject to an external acceleration a, the oscillation of the inertial mass is governed by the dynamic equilibrium equation:

$$m\ddot{x}+b\dot{x}+kx=ma$$

If the frequency $\Omega$ of the external acceleration is well below resonance, i.e., if $\Omega \ll \omega$, $\omega=\sqrt{k/m}$ being the frequency of the accelerometer, the accelerometer response is quasi-static and $x(t) \approx (m/k)a(t)$. The external acceleration turns out to be proportional to the mass displacement and sensing can be done by measuring the mass displacement, e.g., via the capacity variation as in known capacitive accelerometers.

In resonant accelerometers, instead, the input acceleration is detected in terms of a shift in the resonant frequency of a sensing device coupled to the proof mass. The corresponding scheme is represented in FIG. 2, where a resonating beam, shown horizontally, is the above sensing device.

The operating principle is based on the dependence of the resonant characteristic on the axial force which acts on the resonator. The external acceleration a produces a force, F=ma on the inertial mass m. This force produces, in turn, an axial force N in the resonating beam (which is driven in resonance). For a single span beam, frequency increases in the case of a tensile load and decreases in the case of a compressive load.

As is known, denoting by $f_0$ the fundamental frequency of the beam resonating without axial load, the resonant frequency f of the axially loaded beam can be expressed as:

$$f = f_0 \sqrt{1 + \alpha \frac{NL^2}{EI}} \quad (1)$$

wherein:

$$f_0 = \frac{c^2}{2\pi L^2} \sqrt{\frac{EI}{\rho A}} \quad (2)$$

and L, A and I are the length, the cross area and the inertial moment of the resonator, respectively, E is the elastic modulus, and c and $\alpha$ are coefficients depending on the boundary conditions of the resonator. The following table shows the values of these coefficients for several boundary conditions:

|                  | c     | α      |
|------------------|-------|--------|
| clamped-free     | 1.875 | 0.376  |
| sliding-pinned   | 1.572 | 0.405  |
| pinned-pinned    | 3.142 | 0.101  |
| sliding-sliding  | 3.142 | 0.101  |
| clamped-clamped  | 4.730 | 0.0246 |

As a general rule, the external acceleration and resulting force on the resonators produces a variation in the natural frequency of the same resonators and by measuring this frequency variation it is possible to obtain the value of the external acceleration.

Several accelerometers based on the resonant operating principle have been manufactured, through "bulk micromachining" and "surface micromachining" technologies. These known accelerometers have different geometry (in particular different arrangements of the resonating beam with respect to the proof or sensing mass) which greatly affect the amplification of the axial force and hence the sensitivity of the resulting sensor.

None of the proposed sensing structures has proven to be fully satisfactory in terms of the dimensions and electrical characteristics of the resulting accelerometer sensors. In particular, sensitivities limited to the range 10-160 Hz/g have been obtained with the known sensing structures having comparable size.

BRIEF SUMMARY

One embodiment is a resonant accelerometer, having improved physical and electrical characteristics. The resonant accelerometer includes a proof mass, a first anchoring region coupled to the substrate, and a first elastic element coupled to the first anchoring region and the proof mass, the first elastic element configured to allow movement along a sensing axis in response to an external acceleration. The resonant accelerometer also includes a second anchoring region coupled to the substrate, a second elastic element coupled to the second anchoring region and to the proof mass, the second elastic element configured to allow movement along the sensing axis in response to the external acceleration. A first resonating element is coupled to the proof mass via the first elastic element, the first resonating element having a resonant frequency and configured to generate a first variation of the resonant frequency in response to a first axial stress when the proof mass moves along the sensing axis. A second resonating element is coupled to the proof mass via the second elastic element, the second resonating element having the resonant frequency and configured to generate a second variation of the resonant frequency in response to a second axial stress when the proof mass moves along the sensing axis, the second axial stress being substantially opposite to the first axial stress, and the second variation being substantially opposite to the first variation.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein:

FIGS. 8a, 8b are SEM pictures of the structure of FIG. 3a.

DETAILED DESCRIPTION

Figure 1:
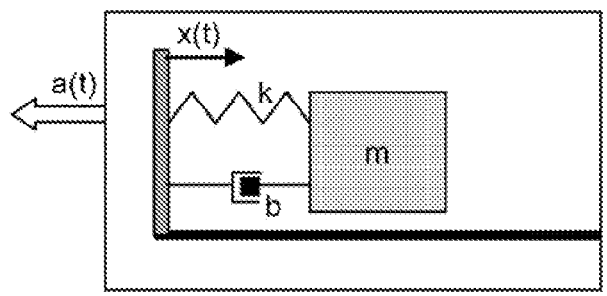
FIGS. 1, 2 show schematic representations of known accelerometer structures.
Figure 2:
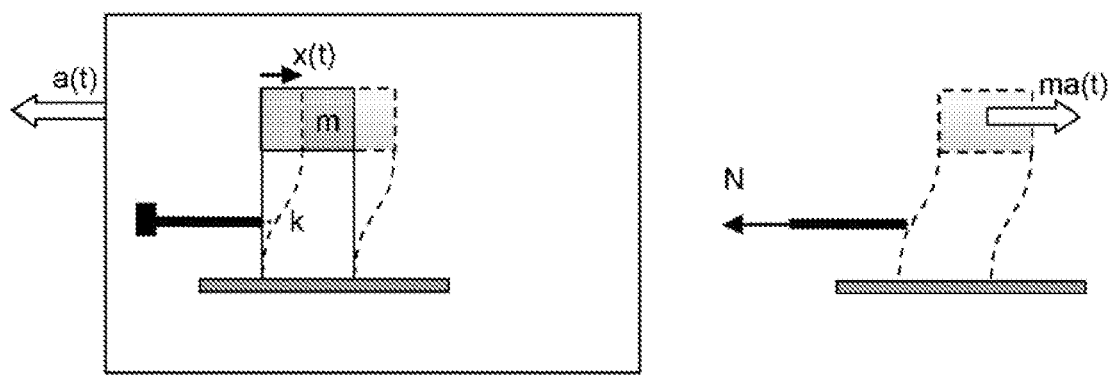
Figure 3A:
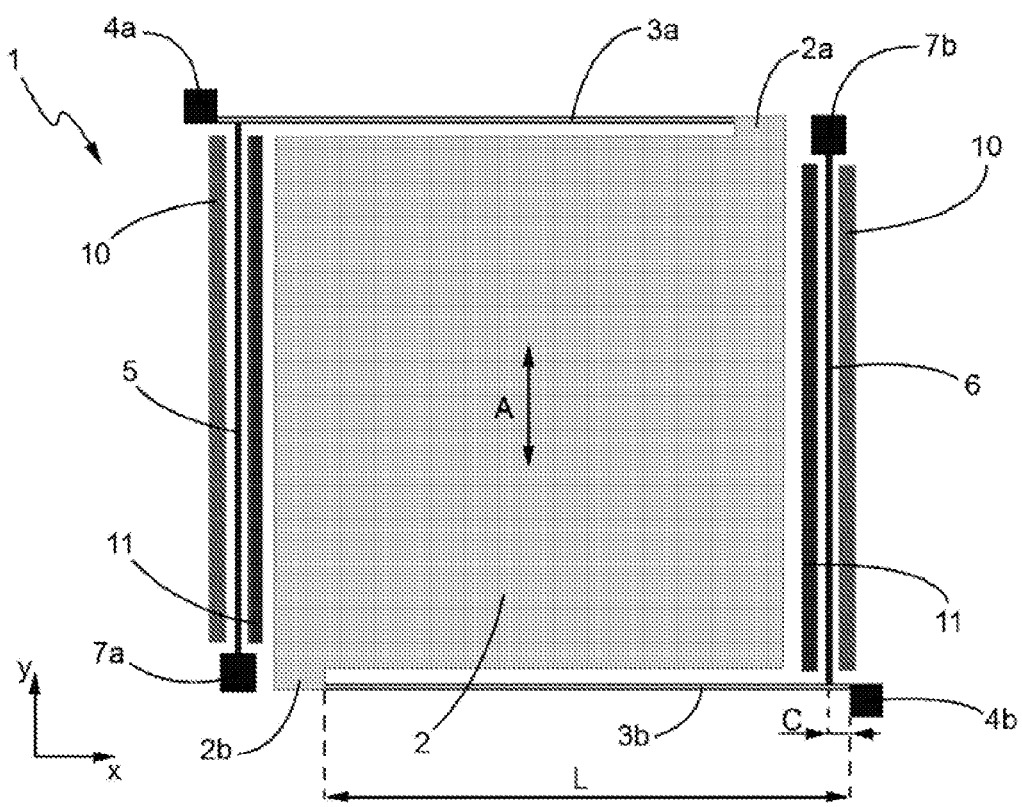
FIGS. 3a and 3b show a sensing structure of a resonant accelerometer according to an embodiment of the present disclosure.
Figure 3C:
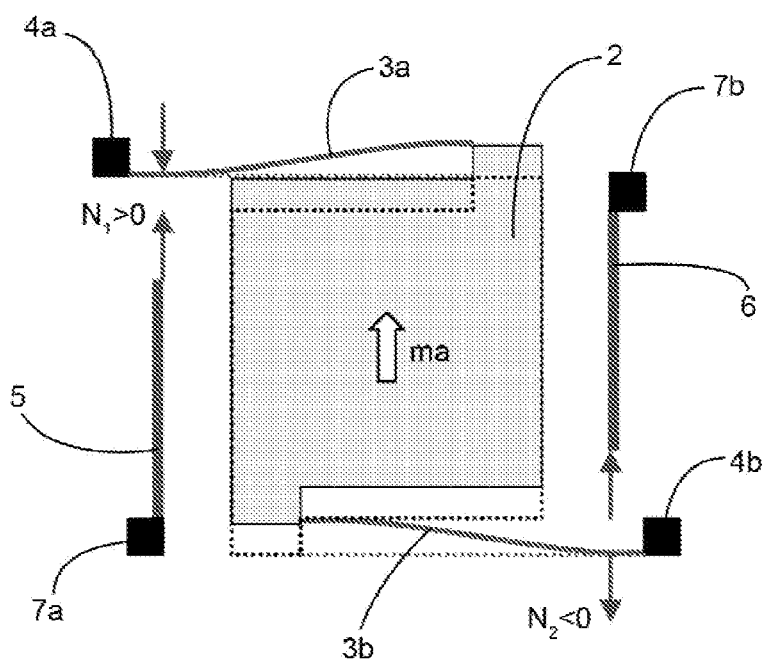
FIG. 3c shows the structure of FIGS. 3a and 3b, when subject to an external acceleration.
Figure 3B:
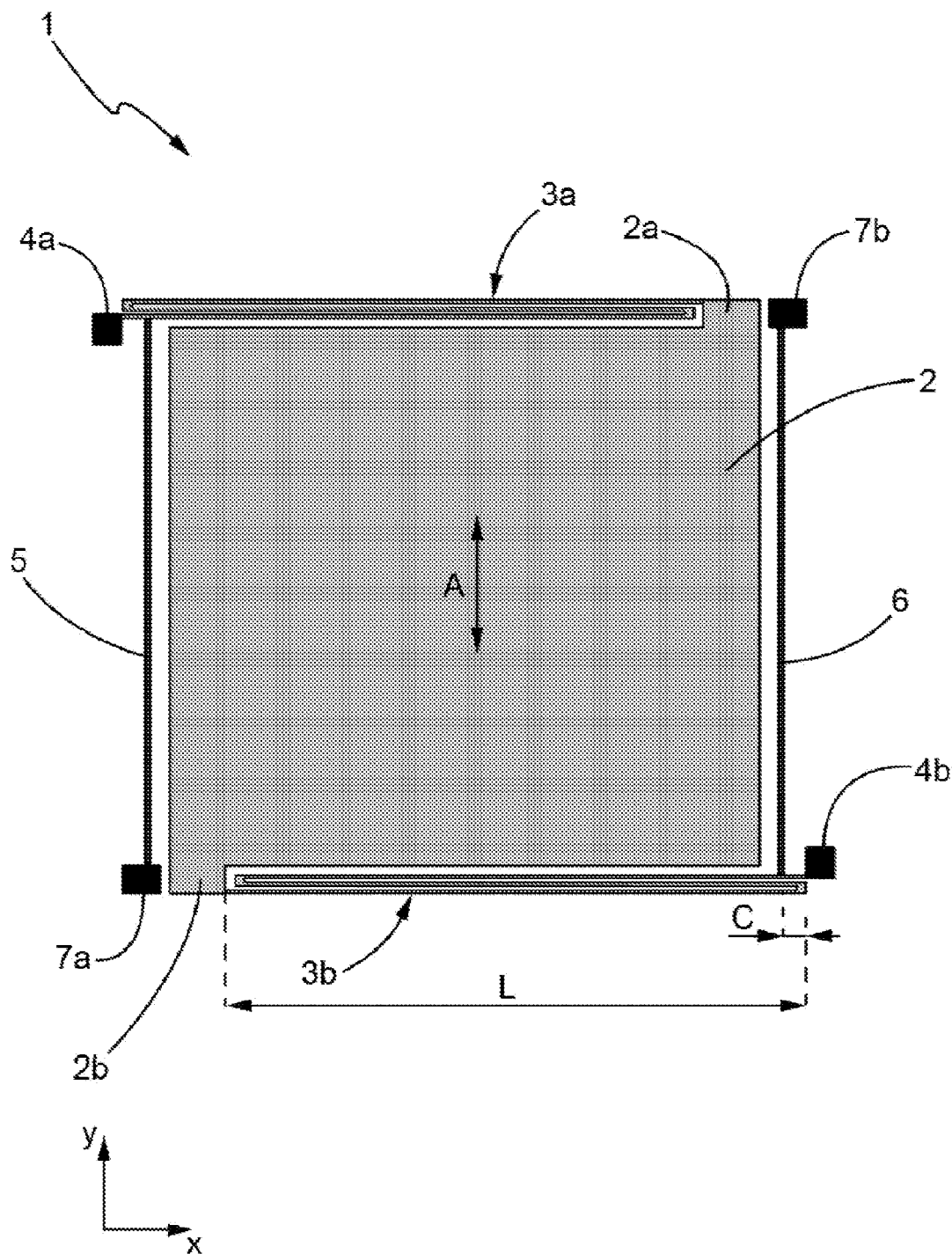

FIGS. 3a, 3b show a MEMS sensing structure of a resonant uniaxial accelerometer according to a first embodiment of the present disclosure, denoted as a whole by 1.

The sensing structure 1 includes a proof (or sensing) mass 2, having a generically square shape (in a main plane of extension xy) and two projections 2a, 2b, extending from diagonally opposite corners of the proof mass 2 (e.g., from the top right and bottom left corner in FIG. 3a).

The proof mass 2 is suspended by means of two springs 3a, 3b which are so configured to restrain its movement to a single uniaxial translation, along axis A (parallel to reference axis y); springs have an elongated structure extending in a direction transversal to the axis A (e.g., orthogonally thereto, parallel to reference axis x). In more detail, springs 3a, 3b can be of a single beam (FIG. 3a) or a folded beam type (having an "S-shape," FIG. 3b).

Springs 3a, 3b are anchored to a substrate of the sensor (not shown) via respective spring anchoring regions 4a, 4b (e.g., pillars extending up to and connected to the substrate); springs thus extend from a respective projection 2a, 2b of the proof mass 2 to a respective spring anchoring region 4a, 4b. In the case of folded springs, the springs have a first longitudinal arm connected to the respective spring anchoring region 4a, 4b, and a second longitudinal arm (connected to the first longitudinal arm via connecting longitudinal and vertical arms) to the proof mass 2, see FIG. 3b.

The resonating part of the sensing structure is constituted by two very thin resonant beams 5, 6, that extend laterally with respect to the proof mass 2 (adjacent to sides thereof that do not face springs 3a, 3b); in the shown embodiment, resonant beams 5, 6 extend longitudinally along the axis A, parallel to reference axis y, laterally to the proof mass with respect to reference axis x.

In particular, resonant beams 5, 6 are attached to the substrate at a first one of their ends, at corresponding beam anchoring regions 7a, 7b, and are attached to a respective spring 3a, 3b at the second one of their ends. The position of the connection point of the resonant beams with the respective springs is denoted with c in FIGS. 3a and 3b and thus extends from the respective spring 3a, 3b to the respective beam anchoring region 7a, 7b. The resonant beams thus form, with the portion extending from the connection point c to the respective spring anchoring region 4a, 4b of the respective springs, a sort of "L-shaped" resonant structure. As it will be explained in detail in the following, the position of the connection point c, of the resonant beams with the respective springs, with respect to the position of the spring anchoring regions, is a factor determining the electrical characteristics of the resonating sensing structure (in particular, in terms of the amplification of the axial force). In more detail, the resonant beams 5, 6 are attached to the respective springs at their first longitudinal arm (which is also connected to the related spring anchoring region).

Driving and sensing of the resonant beams 5, 6 is achieved through two parallel electrodes 10, 11, that are fixed to the substrate (in a way not shown in detail) and extend, in pairs, parallel to the respective resonant beams, facing opposite sides thereof.

For zero external acceleration the resonators have the same nominal frequency $f_0$. When an external acceleration a is applied along axis A, as shown in FIG. 3c, one resonator (e.g., the one constituted by resonant beam 5) is subject to tension and the other resonator (e.g., the one constituted by resonant beam 6) is subject to a compression of the same magnitude N, N1=−N2 (i.e., N1=+N, N2=−N), as shown in FIG. 3c (where the deformations of the springs are shown and the resulting new position of the proof mass 2 is depicted). Accordingly, the frequency f1 of the first resonator increases, while the frequency f2 of the second resonator decreases by substantially the same amount.

Combining the output electrical signals from the two resonators, and using the above discussed equations (1) and (2) linearized around $f_0$, it is possible to obtain the following frequency difference:

$$f_1 - f_2 \cong f_0 \left( 1 + \alpha \frac{NL^2}{2EI} - 1 + \alpha \frac{NL^2}{2EI} \right) = f_0 \alpha \frac{NL^2}{2EI} \quad (3)$$

As it is apparent or may be readily shown, the presence of two resonators undergoing opposite axial forces provides several advantages:

the sensitivity of acceleration detection can be doubled by measuring the difference between the frequency of the two resonators instead of the variation of frequency of a single resonator (the acceleration being proportional to the frequency difference);

the linearity of the system is improved, i.e., the accelerometer response can be linearized in a wider range of accelerations the skew-symmetric geometry is less sensitive to spurious effects of thermal loading, since an inelastic effect causing pre-stress in the resonators is cancelled when considering the difference between the frequencies.

The sensitivity of the accelerometer, defined as the resonator frequency variation produced by an acceleration of 1 g, increases with the dimension of the proof mass 2 but also depends on the position of the resonating beams 5, 6 with respect to the anchor points of the springs 3a, 3b. In order to reduce the device size while keeping a high sensitivity, this position may be advantageously optimized by means of an analytical approach.

Figure 4:
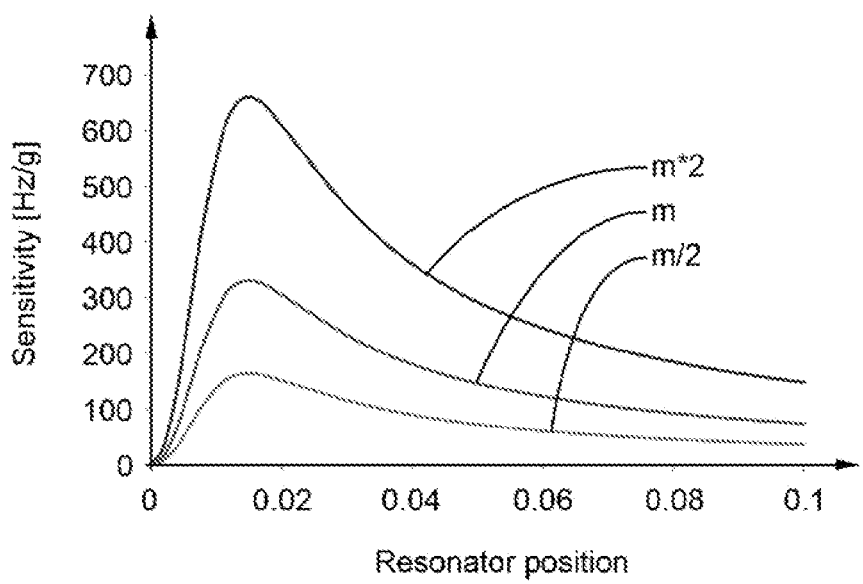
FIG. 4 shows sensitivity plots relating to the structure of FIGS. 3a and 3b.

In this respect, FIG. 4 shows the sensitivity of the accelerometer, derived from equation (3), as a function of the position of the connection points c connecting the resonant beams 5, 6 with the respective springs 3a, 3b expressed as a coordinate along the spring extension (the origin corresponding to the position of the spring anchoring regions 4a, 4b), normalized with respect to the spring length L (see FIGS. 3a, 3b).

It may be noted that an optimal position for the connection point c may be found, very close to the position of the spring anchoring region of the spring, at about $1/60$ of its length L. For example, the connection point c may be formed to be in the range of 1% and 2% of the spring length, L. The different curves correspond to different values of the inertial mass of the proof mass 2.

Figure 5A:
FIG. 5a, shows portions of a known accelerometer structure.
Figure 5B:
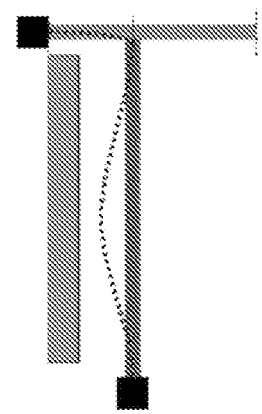
FIG. 5b shows portions of the sensing structure of the accelerometer of FIGS. 3a and 3b.

The above equations (2), (3) can be used for axially constrained beams if transverse oscillations can be considered small with respect to a beam's height. This hypothesis, which is often reasonable for structural problems at the macroscale level, may in general not be valid for microstructures as those of MEMS resonators. In this case nonlinearities of the dynamic response of the resonators alone (for zero external acceleration) due to their very small cross section and hence their small flexural stiffness have also to be considered. However, the peculiar geometry proposed, schematically shown in FIG. 5b (that may be denoted as "L-shaped" resonator) as opposed to the traditional geometry shown in FIG. 5a (standard "I-shaped" doubly clamped resonator), allows to considerably lower the axial force due to the second order effects in the resonator.

A coupled electromechanical analysis has been performed in order to compute the axial force induced in the resonating beam for different levels of the voltage applied to the corresponding electrode, with the two geometric configurations. Both the beam and the dielectric medium between the electrodes should be discretized to compute the electric field and the corresponding mechanical response of the resonator. Since large displacements are considered, the electrostatic problem should be solved on a varying domain, considering the deformed mesh (see for further details C. Comi "On geometrical effects in micro-resonators" Latin American Journal of Solids and Structures, 6, 73-87, 2009).

Figure 6:
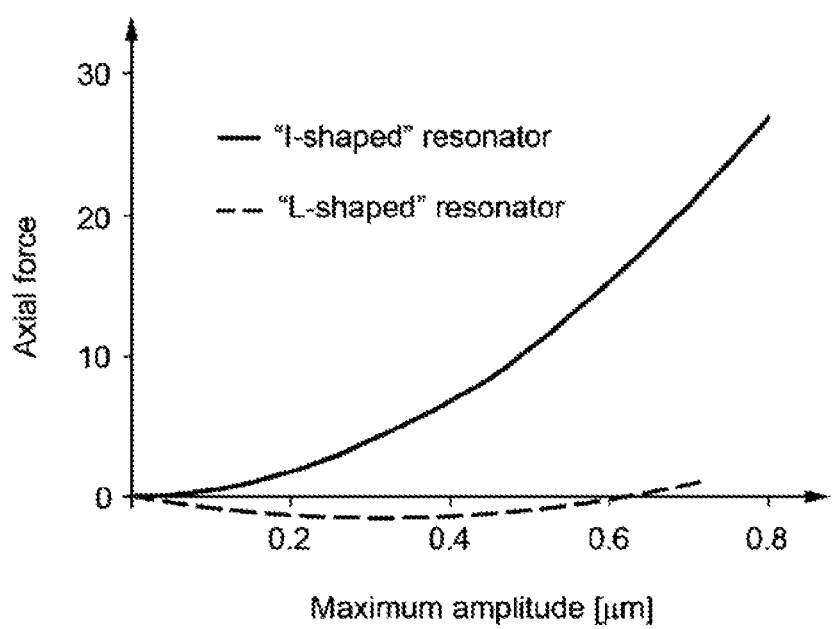
FIGS. 6 and 7 show plots of physical and electrical quantities relating to the structure of FIGS. 3a and 3b.

FIG. 6 shows the computed axial force versus maximum deflection for the two configurations. While for the "I-shaped" resonator, second order effects always induce a tensile axial force, in the case of "L-shaped" resonator the axial force is initially of compression due to the first order term, then, for high values of oscillation amplitude, the nonlinear tension term becomes predominant. In all the considered range of displacement the axial force turns out to be significantly smaller than the one obtained for the "I-shaped" resonator and there is a value of the oscillation for which the axial force vanishes. This feature is very important since it turns to be possible to tune the actuation voltage amplitude in such a way that the axial force vanishes and the oscillator response can be effectively considered as linear (zero axial force for zero external acceleration).

Figure 7:
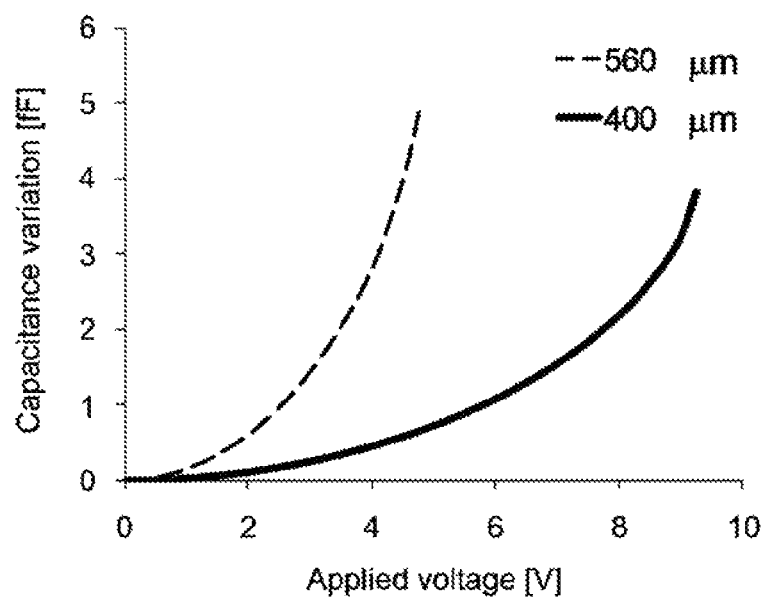

From the above quasi-static electromechanical analyses it is also possible to compute the capacitance variation between the resonant beams 5, 6 and the respective sensing electrodes 10, 11 for increasing voltage applied to the excitation electrode. The results are shown in FIG. 7 for two different resonator lengths. The voltage which can be applied is limited by the pull-in value corresponding to the vertical growth in the capacitance variation.

The dynamic three-dimensional response of the whole accelerometer structure has also been studied by a finite element analysis. The first modal shape corresponds to the in-plane (xy) translation of the proof mass 2 in the sensing direction (axis A), as shown in FIG. 3c. For the device shown in FIG. 8a, the frequency of this mode is 688 Hz. The second mode is an out-of-plane translation of the proof mass 2 and the second frequency is about 10 kHz, well separated from the first one. The modes corresponding to the oscillation of the resonators (i.e. the 5th and 6th modes) have frequencies higher than 50 kHz.

The above discussed sensing structure for the MEMS resonant accelerometer may be produced with known surface micro-machining processes, for example using the so-called ThELMA (Thick Epipoly Layer for Microactuators and Accelerometers) process, which has been developed by the present Applicant, to realize in-silicon inertial sensors and actuators.

The Thelma process allows the realization of suspended structures with a relatively large thickness (15 µm) anchored to the substrate through very compliant parts (springs) and thus capable of moving on a plane parallel to the underlying silicon substrate (the above discussed xy plane), such as the accelerometer structure previously described.

The process includes several manufacturing steps that include forming a substrate thermal oxidation, depositing and patterning horizontal interconnections, depositing and patterning a sacrificial layer, forming an epitaxial growth of a structural layer (15 µm thick polysilicon), patterning the structural layer by trench etching, and removing the sacrificial layer (oxide); and depositing contact metallization.

Figure 8A:
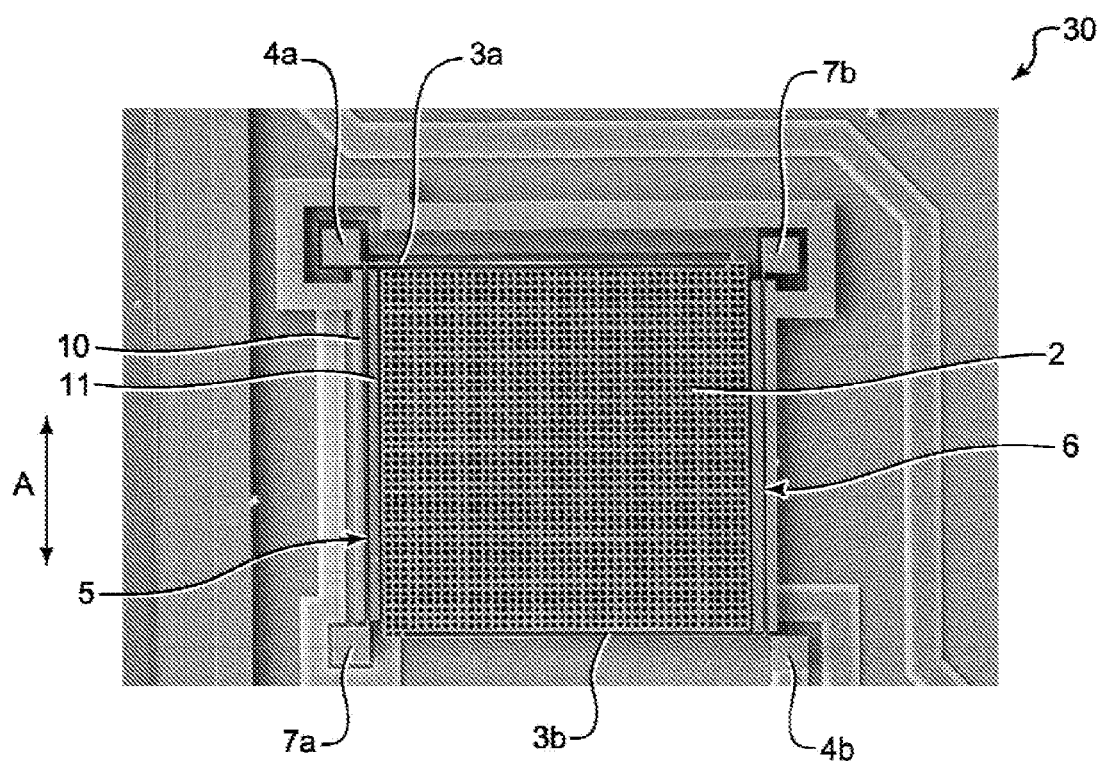

A manufactured accelerometer structure 30 is shown in an SEM image in FIG. 8a. The very thin resonant beams 5, 6 are visible on the right and the left of the proof mass 2, extending in the vertical direction (axis A) between the sensing and excitation electrodes 10, 11. The square-shaped (in plane view) proof mass 2 has holes to allow the complete oxide removal below it (removal of the sacrificial region).

Figure 8B:
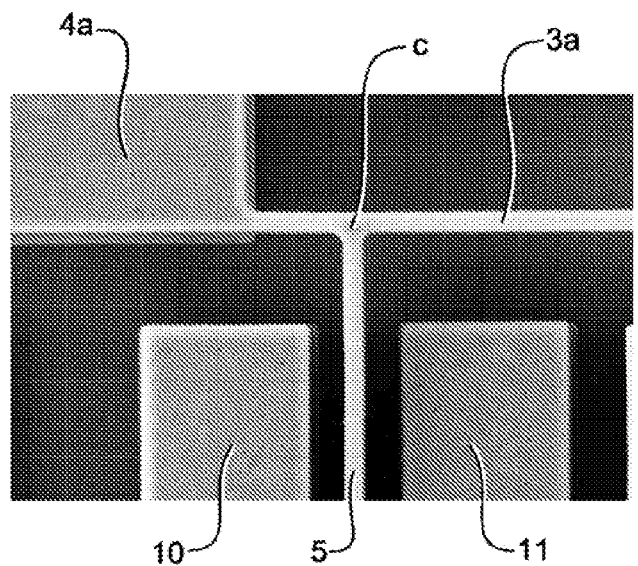

FIG. 8b shows an enlarged detailed view of the anchoring region 4a of the horizontal spring 3a and the connection point c with the vertical resonating beam 5. The upper portions of the associated electrodes 10, 11 are also visible.

From what has been described and illustrated previously, the advantages that the resonant accelerometer according to the disclosure enables are evident.

In particular, it is again underlined that the proposed MEMS sensing structure allows to obtain high sensitivity values, with small overall dimensions (even lower than those of known capacitive accelerometers).

Moreover, the proposed structure allows reduction of the effects of spurious axial forces on the resonant beams.

The optimized proposed design allows production of a very small accelerometer (for example, a proof mass of 400 µm×400 µm) with a high sensitivity (of about 450 Hz/g). If a proof mass with higher size is used (e.g., 700 µm×700 µm), an even higher sensitivity of 2 kHz/g may be obtained.

Moreover, the above high sensitivity values are obtained with low resonant quality factors (Q), having values around 200 (considerably lower than known resonant sensing structures).

Finally, it is clear that modifications and variations may be made to what has been described and illustrated herein, without thereby departing from the scope of the present disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
 a substrate;
 a mass suspended above the substrate;
 a first resonating element;
 a second resonating element spaced from the first resonating element by the mass;
 a first elastic element having a first elongate portion including a first end and a second end, the first end coupled to the mass, the first resonating element being coupled to the first elastic element at a first point on the first elastic element, the first point being closer to the second end than to the first end of the first elongate portion, the first point being between the first end and the second end; and
 a second elastic element having a second elongate portion including a first end and a second end, the first end coupled to the mass, the second resonating element being coupled to the second elastic element at a second point on the second elastic element, the second point being closer to the second end than to the first end of the second elongate portion, the second point being between the first end and the second end.

2. The device of claim 1 wherein the first elastic element is parallel to the second elastic element in a resting state.

3. The device of claim 1 wherein the first resonating element and the second resonating element each have a longitudinal extension in a first direction, the mass being configured to move in a plane in the first direction.

4. The device of claim 1 wherein the mass has a substantially square shape, the first elastic element being coupled to a first corner of the mass and the second elastic element being coupled to a second corner of the mass, the second corner being positioned diagonally with respect to the first corner.

5. The device of claim 4 wherein the first elastic element extends away from the first corner towards the first resonating element and the second elastic element extends away from the second corner towards the second resonating element.

6. The device of claim 1, further comprising a first electrode and a second electrode, the first electrode being separated from the second electrode by the first resonating element.

7. The device of claim 6, further comprising a third electrode and a fourth electrode, the third electrode being separated from the fourth electrode by the second resonating element.

8. The device of claim 1, further comprising a first anchor coupled to the second end of the first elastic element and a second anchor coupled to the second end of the second elastic element.

9. The device of claim 8 wherein the first resonating element includes a first end coupled to the first point and a second end coupled to a third anchor and the second resonating element includes a first end coupled to the second point and a second end coupled to a fourth anchor.

10. The device of claim 1 wherein the first elastic element and the second elastic element are elongated folded springs.

11. A device, comprising:
 a substrate;
 a rectangular mass suspended in a plane above the substrate, the mass having a first side, a second side, a third side, and a fourth side;
 a first resonating element extending along the first side of the mass;
 a second resonating element spaced from the first resonating element by the mass, the second resonating element extending along the second side of the mass;
 a first elastic element extending along the third side of the mass, the first elastic element being coupled between the mass and the first resonating element at a first point on the first elastic element, the first point being between a first end and a second end of the first elastic element; and
 a second elastic element spaced from the first elastic element by the mass, the second elastic element extending along the fourth side of the mass, the second elastic element being coupled between the mass and the second resonating element at a second point on the second elastic element, the second point being between a first end and a second end of the second elastic element.

12. The device of claim 11 wherein the first end of the first elastic element is coupled to the mass, the first point being closer to the second end than to the first end of the first elastic element; and
 the first end of the second elastic element being coupled to the mass, the second point being closer to the second end than to the first end of the second elastic element.

13. The device of claim 11 wherein the first elastic element is coupled to a first corner of the mass and the second elastic element is coupled to a second corner of the mass, the first corner being diagonally positioned with respect to the second corner.

14. The device of claim 11 wherein the first elastic element and the second elastic element are folded springs.

15. A device, comprising:
 a substrate;
 a mass suspended in a plane above the substrate;
 a first L-shaped resonating assembly coupled to the mass, the first resonating assembly including:
  a first anchor;
  a second anchor;
  a first elastic element having a first end coupled to a first corner of the mass and a second end coupled to the first anchor;
  a first resonating element coupled to a first point on the first elastic element and coupled to the second anchor, the first point being closer to the first anchor than to the first corner of the mass, the first point being between the first end and the second end.

16. The device of claim 15, further comprising:
 a second L-shaped resonating assembly coupled to the mass, the second resonating assembly including:
  a third anchor;
  a fourth anchor;
  a second elastic element coupled to a second corner of the mass and coupled to the third anchor;
  a second resonating element coupled to a second point on the second elastic element and coupled to the fourth anchor, the second point being closer to the third anchor than to the second corner of the mass.

17. The device of claim 16 wherein the first point is closer to a third corner of the mass than to any other corner of the mass and the second point is closer to a fourth corner of the mass than to any other corner of the mass, the third corner being diagonally positioned with respect to the fourth corner.

18. The device of claim 15 wherein the first resonating element has a longitudinal extension along a first direction and the first elastic element has a longitudinal extension along a second direction, the first direction being transverse to the second direction.

19. The device of claim 15 wherein the first elastic element is a folded spring having a length that is transverse to a length of the first resonating element.

\* \* \* \* \*